(12) United States Patent
Cochran et al.

(10) Patent No.: US 7,165,141 B2
(45) Date of Patent: Jan. 16, 2007

(54) DAISY-CHAINED DEVICE-MIRRORING ARCHITECTURE

(75) Inventors: Robert A Cochran, Roseville, CA (US); Marcel Duvekot, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 10/787,161

(22) Filed: Feb. 27, 2004

(65) Prior Publication Data

US 2005/0193179 A1    Sep. 1, 2005

(51) Int. Cl.
*G06F 12/16* (2006.01)

(52) U.S. Cl. .......................... 711/114; 711/162; 714/6; 714/7

(58) Field of Classification Search ...................... None
See application file for complete search history.

(56) References Cited

U.S. PATENT DOCUMENTS

| | | | | |
|---|---|---|---|---|
| 5,617,530 | A * | 4/1997 | Stallmo et al. | 714/6 |
| 5,742,792 | A * | 4/1998 | Yanai et al. | 711/162 |
| 5,799,141 | A * | 8/1998 | Galipeau et al. | 714/13 |
| 5,889,935 | A * | 3/1999 | Ofek et al. | 714/6 |
| 6,044,444 | A * | 3/2000 | Ofek | 711/162 |
| 6,052,797 | A * | 4/2000 | Ofek et al. | 714/6 |
| 6,173,377 | B1 * | 1/2001 | Yanai et al. | 711/162 |
| 6,182,198 | B1 * | 1/2001 | Hubis et al. | 711/162 |
| 6,216,211 | B1 * | 4/2001 | McBrearty et al. | 711/162 |
| 6,295,578 | B1 * | 9/2001 | Dimitroff et al. | 711/114 |
| 6,308,283 | B1 * | 10/2001 | Galipeau et al. | 714/6 |
| 6,502,205 | B1 * | 12/2002 | Yanai et al. | 714/7 |
| 6,665,780 | B1 * | 12/2003 | Bradley | 711/162 |
| 6,691,245 | B1 * | 2/2004 | DeKoning | 714/6 |
| 6,795,895 | B1 * | 9/2004 | Merkey et al. | 711/114 |
| 6,820,180 | B1 * | 11/2004 | McBrearty et al. | 711/162 |
| 7,032,126 | B1 * | 4/2006 | Zalewski et al. | 714/7 |
| 7,055,059 | B1 * | 5/2006 | Yanai et al. | 714/7 |
| 7,100,072 | B1 * | 8/2006 | Galipeau et al. | 714/6 |
| 2001/0047462 | A1 * | 11/2001 | Dimitroff et al. | 711/162 |
| 2002/0049925 | A1 * | 4/2002 | Galipeau et al. | 714/6 |
| 2002/0083281 | A1 * | 6/2002 | Carteau | 711/161 |
| 2003/0126107 | A1 * | 7/2003 | Yamagami | 707/1 |
| 2003/0191916 | A1 * | 10/2003 | McBrearty et al. | 711/162 |
| 2003/0191917 | A1 * | 10/2003 | McBrearty et al. | 711/162 |
| 2004/0034808 | A1 * | 2/2004 | Day et al. | 714/6 |
| 2005/0010731 | A1 * | 1/2005 | Zalewski et al. | 711/162 |
| 2005/0028025 | A1 * | 2/2005 | Zalewski et al. | 714/6 |

* cited by examiner

*Primary Examiner*—Kevin Verbrugge

(57) ABSTRACT

A method of operating a daisy-chained device-mirroring architecture (where such an architecture may include a storage node N configured to mirror data on an entity representing node N−1, a storage node N+1 daisy-chain-coupled via a first main link to, and configured to mirror data on, the node N, and a storage node N+2 daisy-chain-coupled via a second main link to, and configured to mirror data on, the node N+1, each of the nodes N and N+1 being operable under normal circumstances to forward writes received thereby to the nodes N+1 and N+2 via the first and second main links, respectively), where such a method may include: tracking, at the node N, acknowledgments by the node N+1 and by the node N+2 of writes that the node N has forwarded.

34 Claims, 10 Drawing Sheets

| Write_Where (Track#, Sector#) | Write_What (data) | Sequence_Num (value) | ACK Node N+1 (true=1/false=0) | ACK Node N+2 (true=1/false=0) |
|---|---|---|---|---|
| 3, 200 | 010 | 1 | 1 | 1 |
| 5, 126 | 100 | 2 | 1 | 0 |
| 13, 500 | 111 | 3 | 1 | 0 |
| 2, 096 | 110 | 4 | 0 | 0 |
| 10, 312 | 001 | 5 | 0 | 0 |

FIG. 3

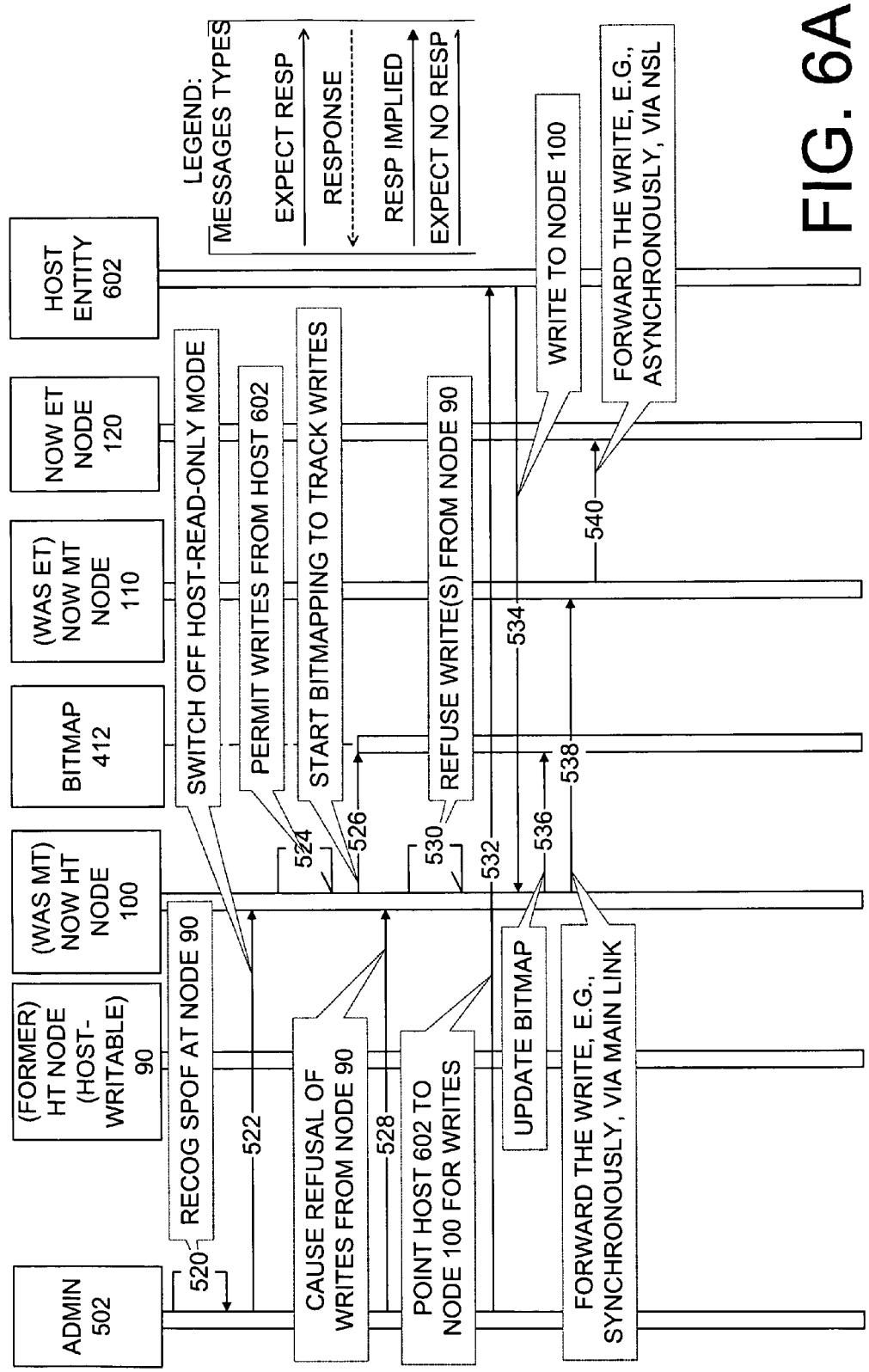

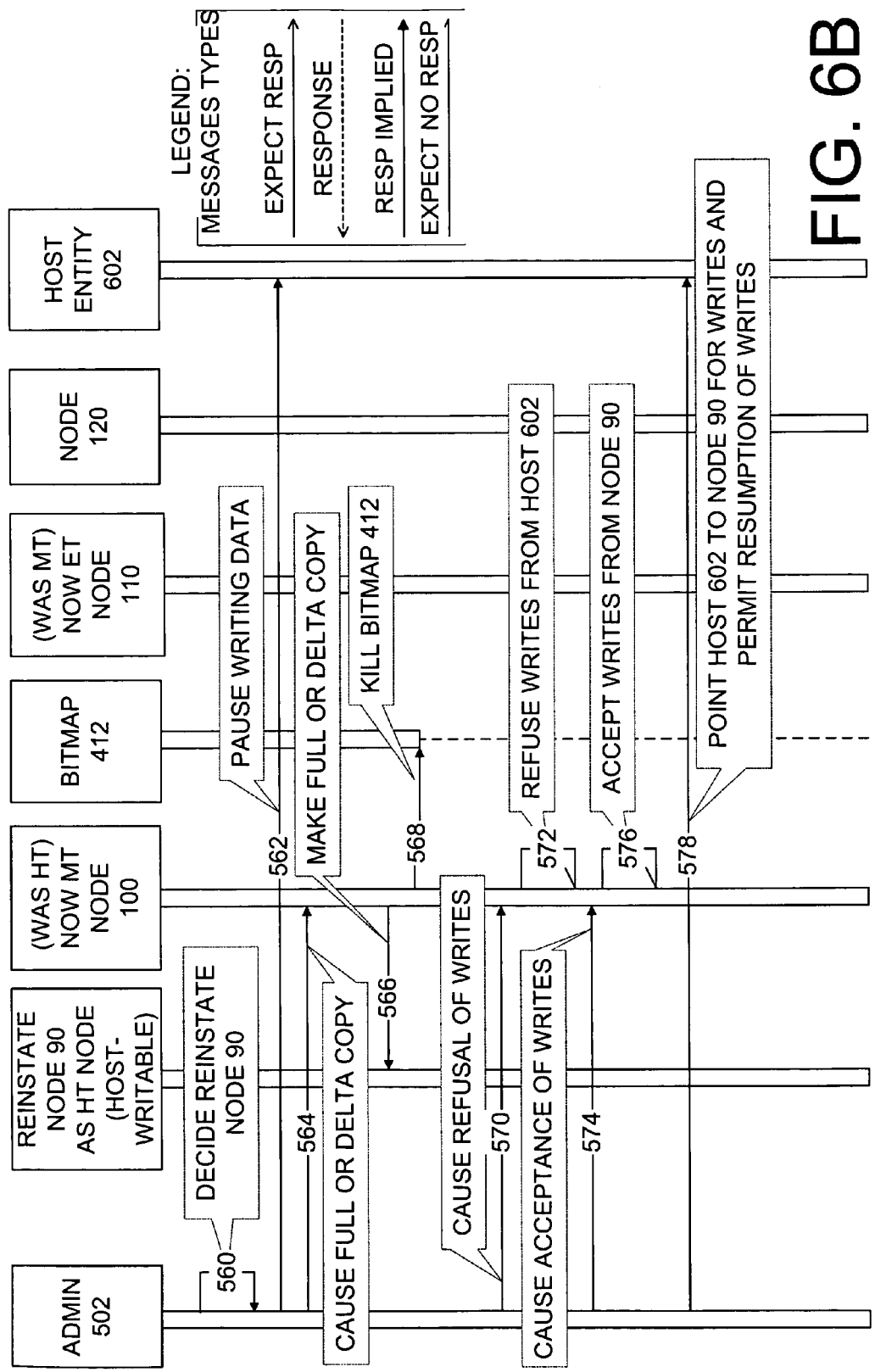

DAISY-CHAINED DEVICE-MIRRORING ARCHITECTURE

BACKGROUND OF THE PRESENT INVENTION

It is common practice in many industries to provide a backup data storage entity. In critical applications and industries, host entities often have multiple data storage entities coupled through a controller to a computer and operated in a mirrored (also known as shadowed) configuration. In a mirrored configuration, data storage entities are treated as pairs, and all data intended for a particular data storage device is duplicated on a block-for-block basis on the paired "mirrored" data storage entity. Mirroring can be accomplished by special circuitry or by computer program control, or a combination thereof.

One type of mirroring architecture is asynchronous mirroring. Using asynchronous mirroring, once a write command (hereafter referred to as a "write") is received at a primary storage entity, a completion acknowledgment is sent directly back to an originating host entity to indicate that a subsequent write may be sent. However, this acknowledgment may not necessarily indicate that the write was received at (or even yet transmitted to) a remote storage entity. Instead, if the write is placed in the buffer of the primary storage entity, then the write is issued a sequence number indicating its position in relation to the other writes stored in the buffer. Subsequently, the write can be forwarded to the remote storage entity.

Another type of mirroring is synchronous mirroring. In contrast to asynchronous mirroring, a synchronous mirror primary storage entity delays sending acknowledgement (of having completed a write from the host entity) until the primary storage entity has received acknowledgement that the secondary storage entity has completed the write (that the primary storage entity had forwarded). Relative to asynchronous mirroring, synchronous mirroring delays the host from sending a second write until two storage entities (instead of merely one) in the chain have actually received a first write.

FIG. 1 illustrates a cascaded (also known as daisy-chained) asynchronous mirroring architecture 5, according to the Background Art. Architecture 5 includes a host entity 10 in communication with a primary storage entity 20. The primary storage entity 20 is in communication with a secondary storage entity 30. Primary storage entity 20 receives writes from host entity 10. Subsequently, the primary storage entity 20 passes these writes to secondary storage entity 30.

Sidefiles 50 and 70 are used at each of storage entities 20 and 30 in order to track writes received and forwarded by the respective storage entity 20 and 30. A sidefile includes fields for sequence numbers, location of the storage media (e.g., one or more tracks) and data. A sidefile operates to numerically and sequentially sort data sent to a respective storage entity before it is forwarded to a remote mirrored storage entity. When a write is received, it may be that the storage entity is unable at that time to immediately write the associated data to its storage media. In such a case, such received data will be stored in a buffer at the storage entity in order to allow the sender of such writes to continue sending writes to the storage entity uninterrupted. However, this buffered data should be sequenced so that it may be appropriately written to the storage medium of the storage entity.

As a write is placed in the primary storage entity's buffer, the write is assigned a sequence number that is stored and tracked within the sidefile. The sequence number may be coupled with associated pointers to the data (that is the subject of the write) and to a track(s) where the data must be written. At an earliest possible time, the primary storage entity references the sidefile to determine the oldest sequence number therein and sends at least the corresponding write to the remote storage entity. Once execution of a write associated with a specific sequence number in the sidefile is completed at the remote storage entity, then a pointer 52 will be updated to indicate a next sequence number (NSN) that should be next applied to the remote storage entity. Pointer (hereafter, an NSN pointer) 52, for example, is illustrated immediately adjacent to sidefile 50. Similarly, sidefile 70 has an NSN pointer 72.

Writes communicated from primary storage entity 20 to secondary storage entity 30 will now be discussed in detail. It is assumed that primary storage entity 20 and secondary storage entity 30 are in paired status. That is, any writes received at primary storage entity 20 are necessarily sent to secondary storage entity 30. As a write at primary storage entity 20 is applied to a storage medium thereof, primary storage entity 20 also initiates a communication of this write to secondary storage entity 30. In FIG. 1, such propagation of writes from primary storage entity 20 to secondary storage entity 30 is represented by the sequence numbers, e.g., 1, 2, 3 and 4, being illustrated next to communication path 32 therebetween. As the writes are sent from primary storage entity 20, NSN pointer 52 to sidefile 50 is remapped accordingly. It should be noted that the sequence numbers 1, 2, 3 and 4, at this time, still remain in sidefile 50.

As writes are received at secondary storage entity 30, they are written to sidefile 70. According to the example circumstances of FIG. 1, sidefile 70 indicates that the write associated with sequence number 1 sent from primary storage entity 20 is accounted for. Once this occurs, secondary storage entity 30 may transmit an acknowledgment to primary storage entity 20 that the sequence number 1 and its associated write is accounted for at secondary storage entity 30. Upon receipt of this acknowledgment, primary storage entity 20 is at liberty to remove the sequence number 1 from sidefile 50.

SUMMARY OF THE PRESENT INVENTION

At least one embodiment of the present invention provides a method of operating a daisy-chained device-mirroring architecture. Such an architecture may include: a storage node N configured to mirror data on an entity representing node N−1; a storage node N+1 daisy-chain-coupled via a first main link to, and configured to mirror data on, the node N; and a storage node N+2 daisy-chain-coupled via a second main link to, and configured to mirror data on, the node N+1. Each of the nodes N and N+1 can be operable under normal circumstances to forward writes received thereby to the nodes N+1 and N+2 via the first and second main links, respectively. Such a method may include: tracking, at the node N, acknowledgments by the node N+1 and by the node N+2 of writes that the node N has forwarded.

Additional features and advantages of the invention will be more fully apparent from the following detailed description of example embodiments, the accompanying drawings and the associated claims.

The remaining drawings are: intended to depict example embodiments of the invention and should not be interpreted to limit the scope thereof.

Figure 1:
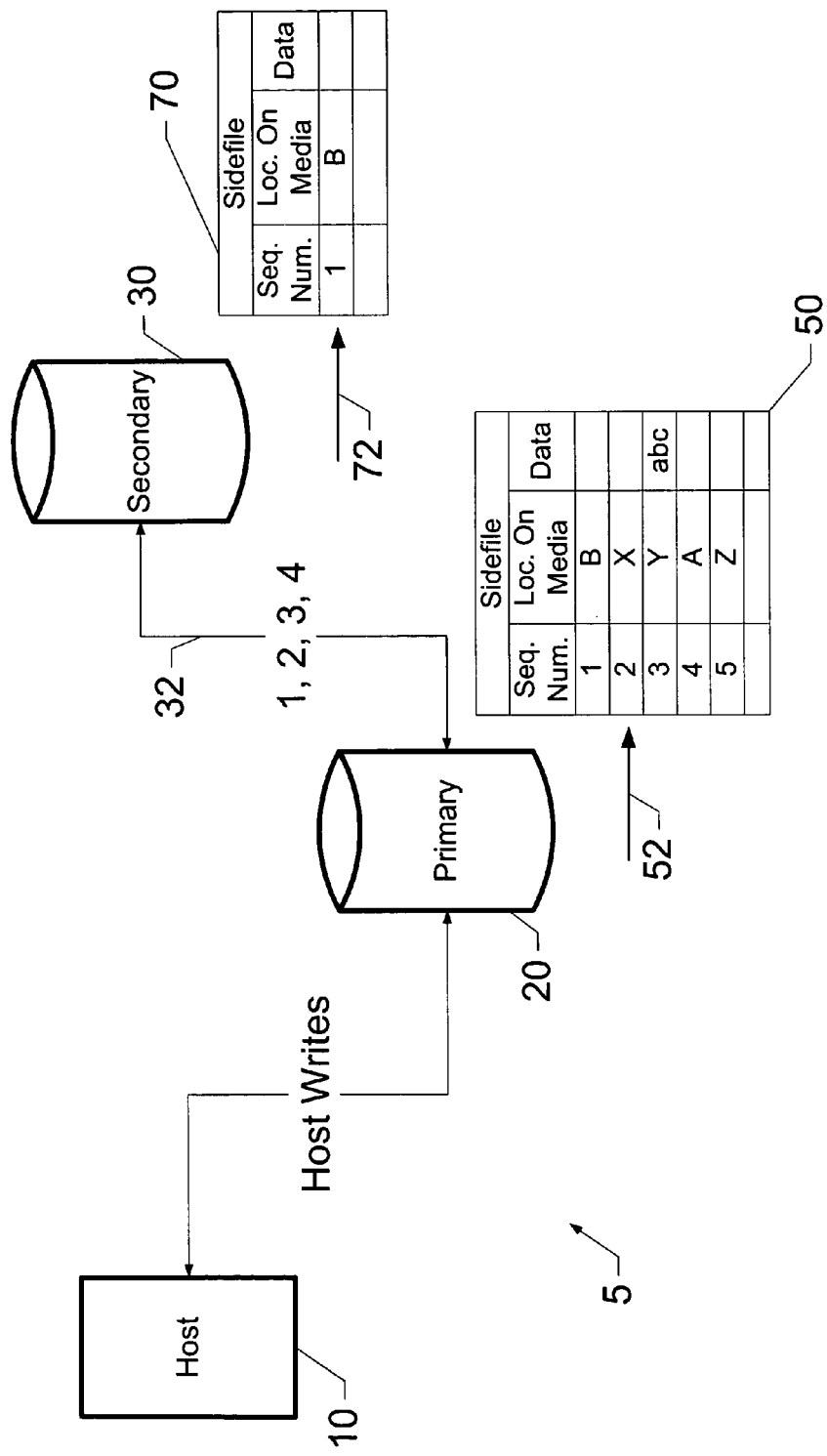
FIG. 1 illustrates a cascaded or daisy-chained asynchronous mirroring variety of data storage architecture, according to the Background Art.
Figure 2:
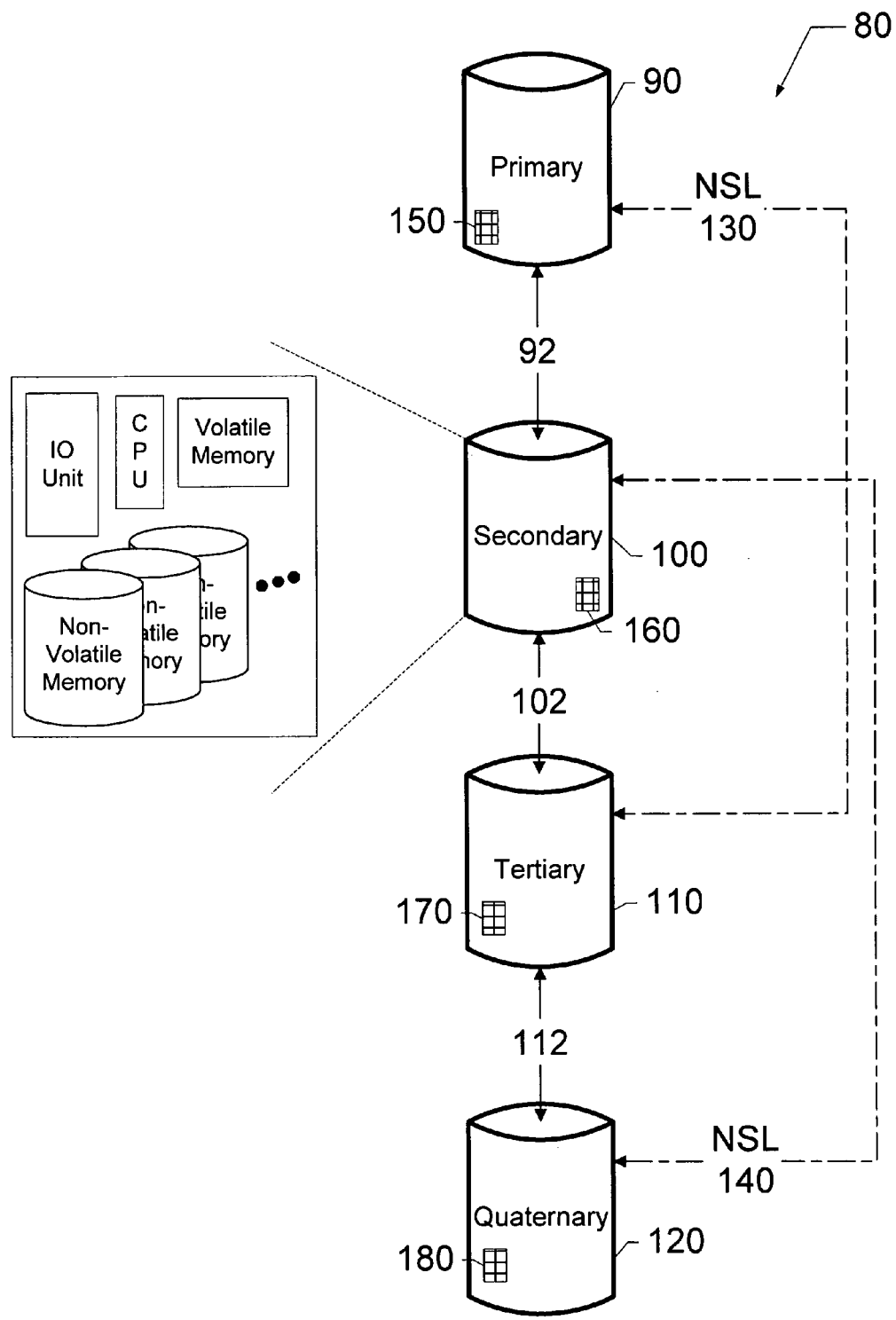

FIG. 2 illustrates a multi-site hierarchical pseudo-cascaded (also known as pseudo-daisy-chained) synchronous and asynchronous mirroring variety of data storage architecture, according to at least one embodiment of the present invention.

FIG. 3 illustrates a sidefile according to at least one embodiment of the present invention.

Figure 4A:
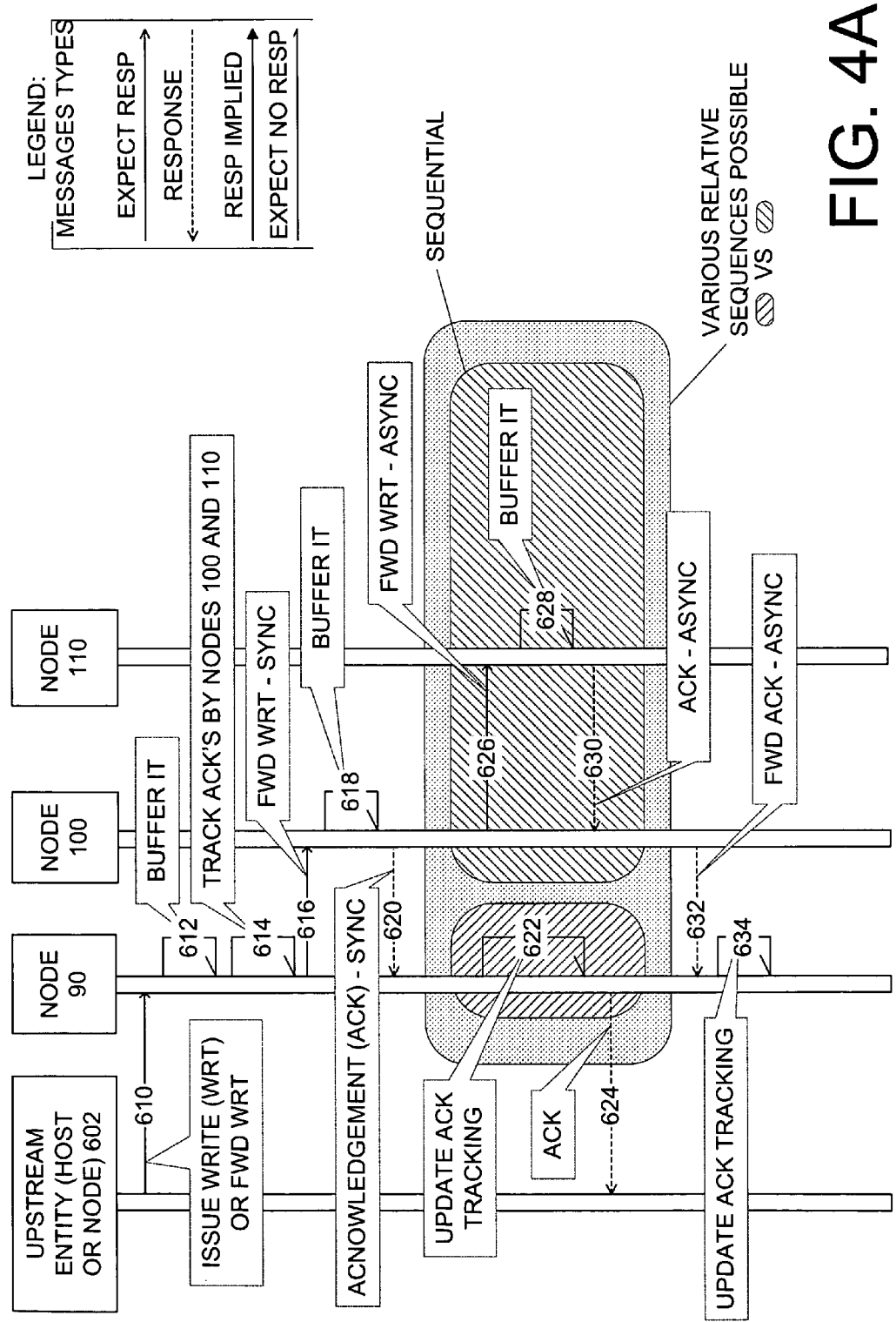

FIG. 4A is a UML-type sequence diagram according to at least one embodiment of the present invention. In a sequence diagram, ⎯→ indicates an action that expects a response message. A ⎯ indicates a response message. A ⎯ indicates an action for which the response is implied. And a ⎯ indicates an action for which no response is expected.

Figure 4B:
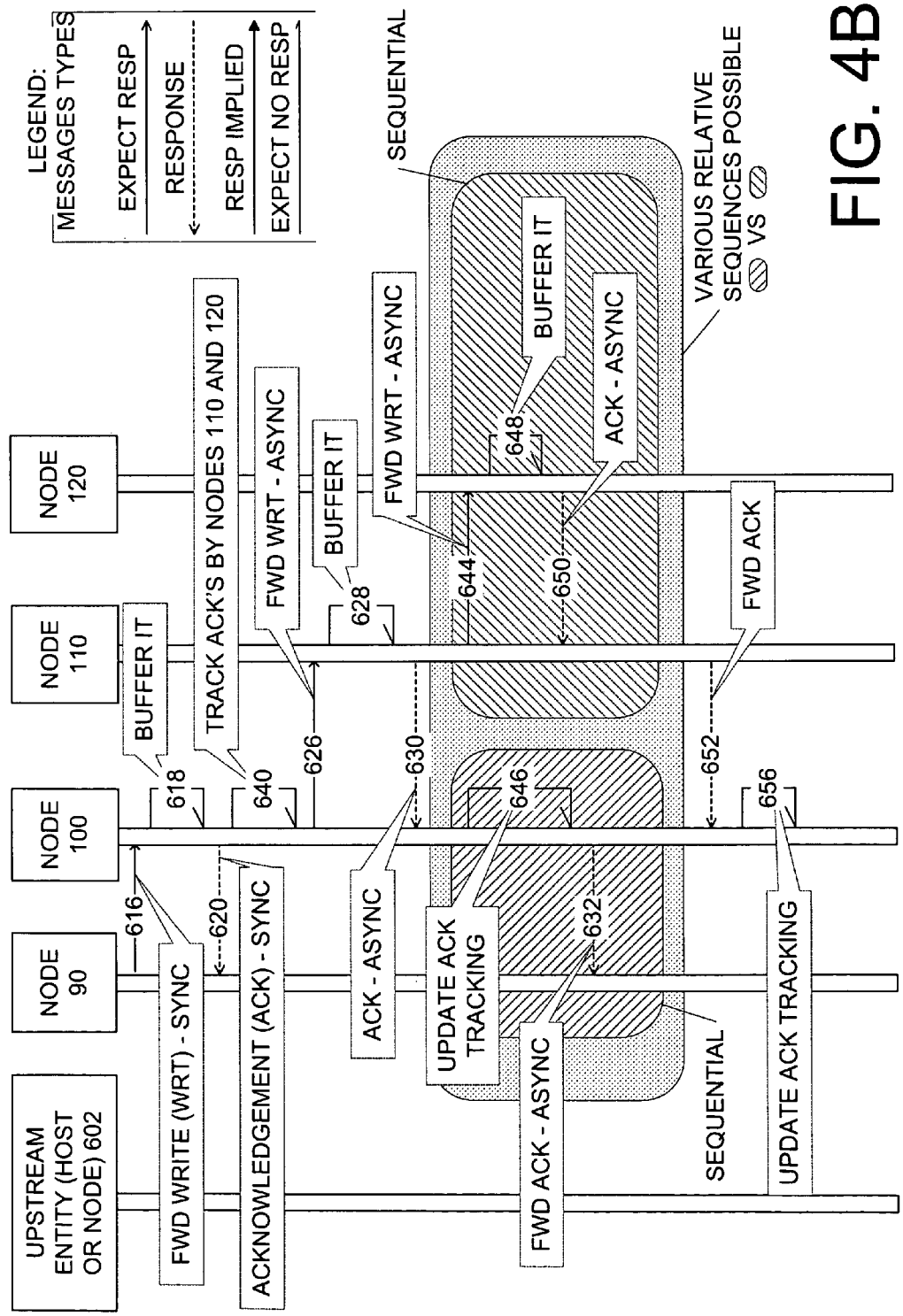

FIG. 4B is a UML-type sequence diagram according to at least one embodiment of the present invention.

Figure 5A:
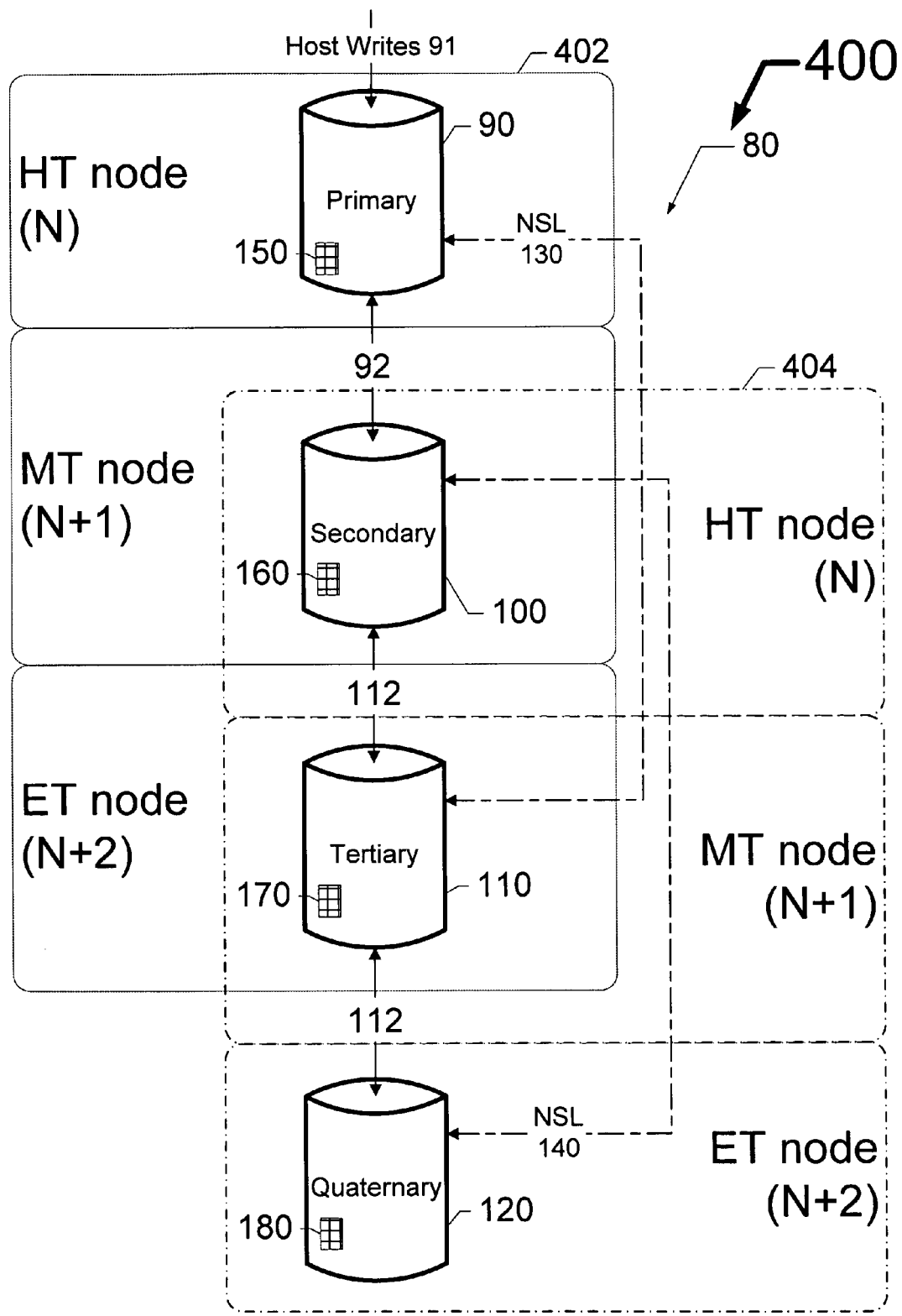

FIG. 5A illustrates an abstracted multi-site hierarchical pseudo-cascaded (also known as pseudo-daisy-chained) synchronous and asynchronous mirroring variety of data storage architecture illustrated in terms of the example of FIG. 2, according to at least one embodiment of the present invention.

Figure 5B:
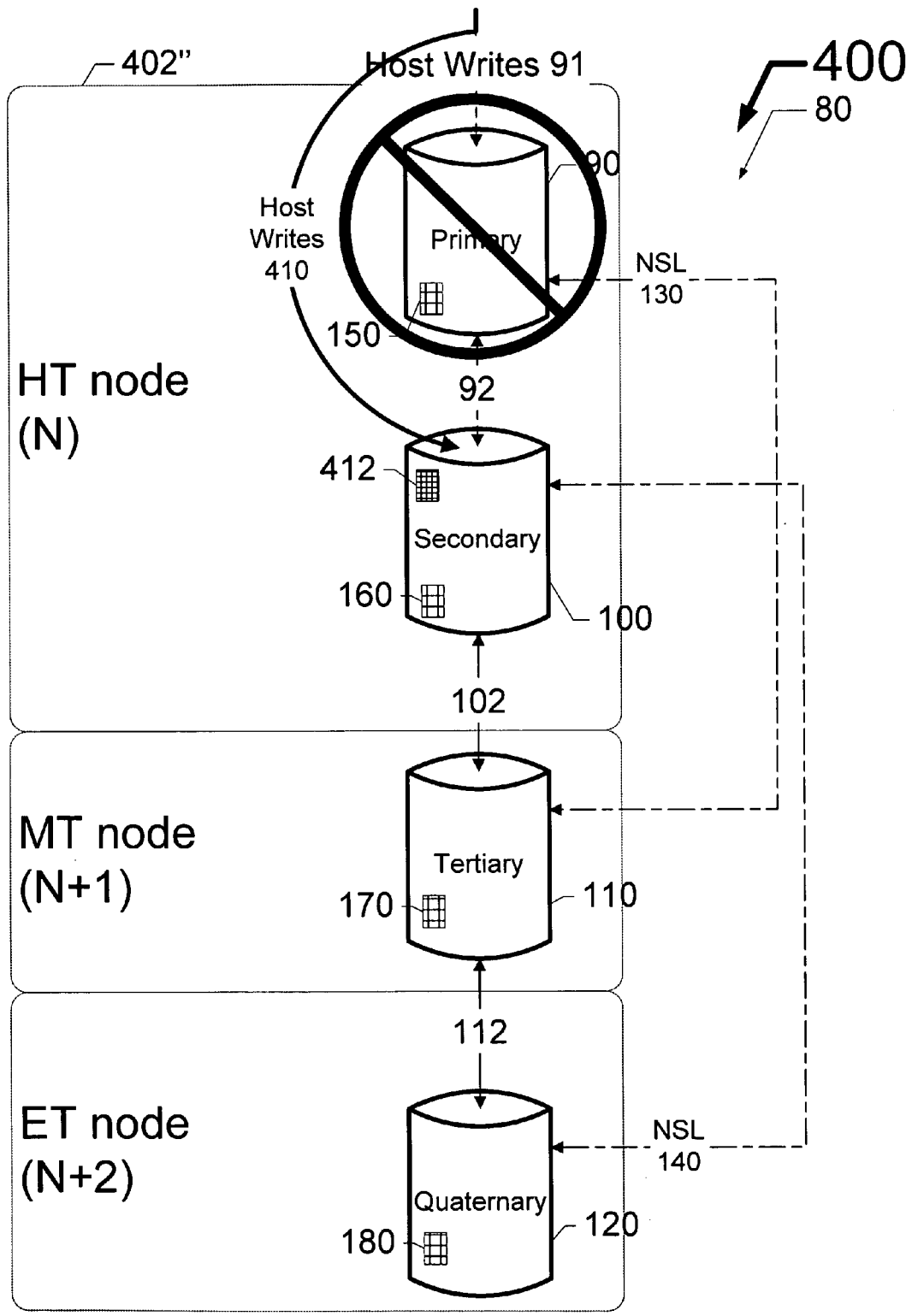

FIG. 5B is an adaptation of FIG. 5A for a circumstance in which an HT (Head-of-Triple) node represents a single point of failure, according to at least one embodiment of the present invention.

Figure 5C:
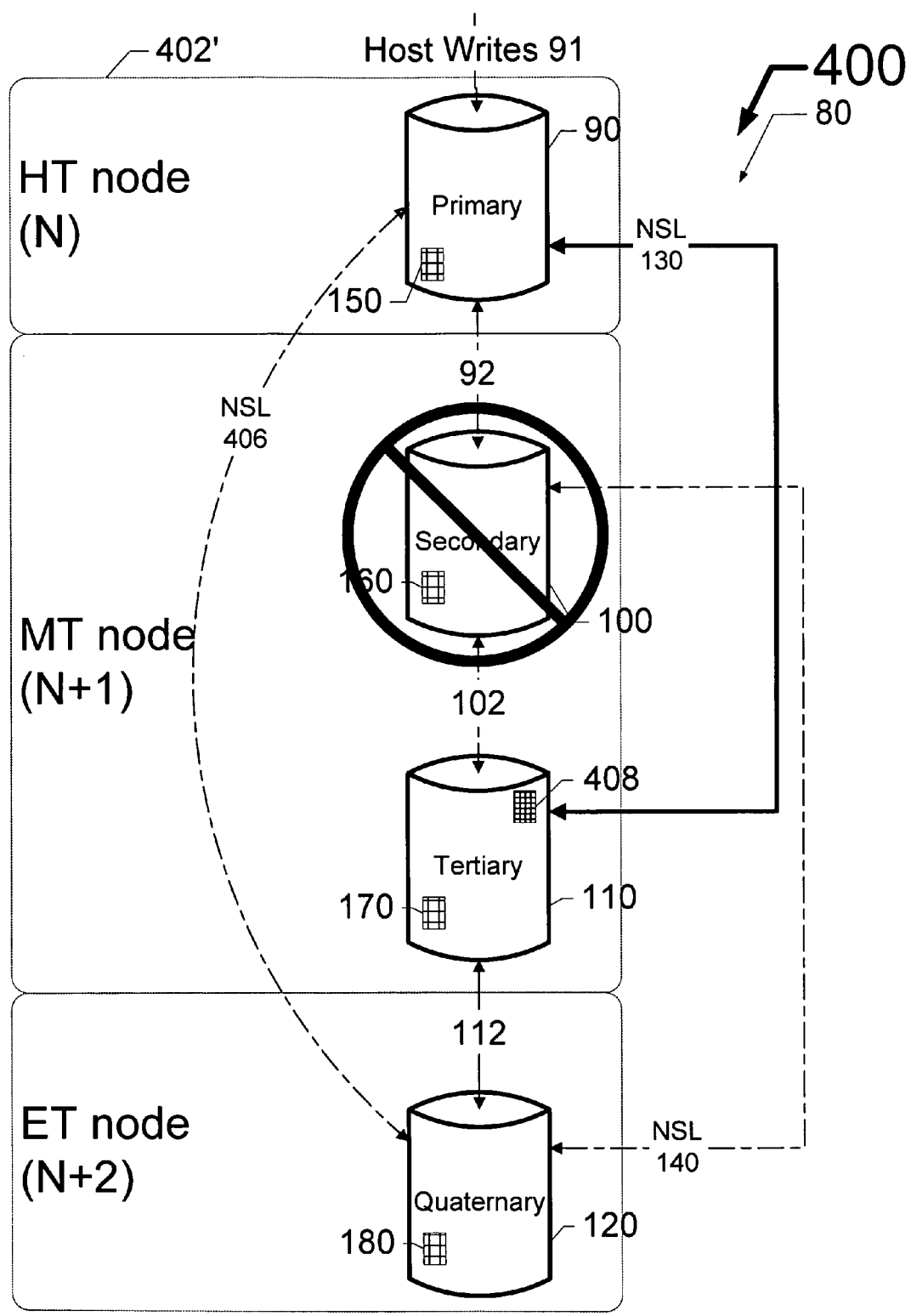

FIG. 5C is an adaptation of FIG. 5A for a circumstance in which an MT (Middle-of-Triple) node represents a single point of failure, according to at least one embodiment of the present invention.

FIG. 6A is a UML-type sequence diagram related to FIG. 5A, according to at least one embodiment of the present invention.

FIG. 6B is a UML-type sequence diagram related to FIG. 5A, according to at least one embodiment of the present invention.

DETAILED DESCRIPTION OF EXAMPLE EMBODIMENTS

In developing the present invention, the following problem with the Background Art was recognized and a path to a solution identified. A problem with daisy-chained architecture 5 of the Background Art is that if primary storage entity 20 fails, then the propagation of writes (again, meaning "write commands") to secondary storage entity 30 is terminated. In other words, architecture 5 (and daisy-chained mirroring architectures in general) cannot tolerate any single point of failure (SPOF). As a result of the failure of primary storage entity 20, only stale and unchanging data will reside on secondary storage entity 30 (which represents the most remote disaster recovery site), which progressively erodes the disaster recovery-effectiveness of secondary storage entity 30 as time elapses (and the data grows progressively more stale). But a daisy-chained mirroring architecture can be made to tolerate an SPOF in exchange for some slightly increased downstream storage node responsibility. In particular, rather than making a storage node N responsible only for updating downstream storage node N+1, storage node N can also be made responsible for updating storage node N+2. Should node N+1 represent an SPOF, node N+2 can be made to take over for node N+1 via a relatively seamless transition. Accordingly, embodiments of the present invention can tolerate an SPOF.

FIG. 2 illustrates a multi-site hierarchical pseudo-cascaded (also known as pseudo-daisy-chained) synchronous and asynchronous mirroring variety 80 of data storage architecture, according to at least one embodiment of the present invention. Architecture includes a primary storage node 90 in communication via a main link 92 with a secondary storage node 100. Secondary storage node 102 is in communication via a main link 102 with a tertiary storage node 110. Tertiary storage node 110 is in communication via a main link 112 with a quaternary storage node 120. Architecture 80 is a redundant data storage arrangement, meaning the data stored on primary storage node 90 may be replicated by secondary storage node 100, tertiary storage node 10 and quaternary storage node 120 in a downstream data cascade fashion.

Storage node hardware components, in general, are known. Hence, for simplicity, an exploded view of only one storage node, e.g., secondary storage node 100 is provided in FIG. 2. The exploded view shows typical hardware components for secondary storage node 100, which include a CPU/controller, an I/O unit, volatile memory such as RAM and non-volatile memory media such disk drives and/or tape drives, ROM, flash memory, etc.

Primary storage node 90 is host writable such that it can accept writes (as shown by path 91 in FIG. 5A) from another entity, e.g., a host entity (not illustrated in FIG. 2, but see item 602 in FIG. 4A as discussed below), that uses secondary storage node 102 as a synchronous backup. Alternatively, primary storage node 90 can receive writes forwarded downstream by an upstream storage node. Secondary, tertiary and quaternary storage nodes 100, 110 and 120 are not normally host-writable (or, in other words, normally run in a host-read-only mode). Rather, they are writable by the immediately upstream storage nodes, namely: quaternary storage node 120 is writable by tertiary storage node 110; tertiary storage node 110 is writable by secondary storage node 100; and secondary storage node 100 is writable by primary storage node 90.

Communication, e.g., synchronous communication, between primary storage node 90 and secondary storage node 100 is bidirectional and may be achieved by way of any known communications scheme. In particular, communication between primary storage node 90 and secondary storage node 100 may be achieved by way of telephone lines (e.g., ATM, T3, etc.), wireless technology and/or optical communication technology. Moreover, although FIG. 2 illustrates the communication technology between primary storage node 90 and secondary storage node 100 as being a single bidirectional communication line, it should be clear that this is not limiting of the present invention. As an example of an alternative, the communication technology may be implemented as a one-way communication line from primary storage node 90 to secondary storage node 100, and in turn another one-way communication line from secondary storage node 100 back to primary storage node 90.

Other communication variations may also be implemented as desired. Similarly, the communication technology between the other various storage nodes of the present invention may also be varied. Moreover, although not illustrated in FIG. 2, primary storage node 90 and the various other storage nodes (100, 110, 120) may be readily modified, or may implement communication technology to allow communication to another storage node(s) and/or source(s)

illustrated, or other storage node(s) and/or source(s) not illustrated, as required by the operational characteristics of the data storage system.

In addition to the communication technology discussed above, architecture 80 also includes a standby Storage Node Shunting Link (NSL) 130 that may provide communication between primary storage node 90 and tertiary storage node 110. Similarly, an NSL 140 is also provided to allow communication between secondary storage node 100 and quaternary storage node 120. The specific operational purpose of NSLs 130 and 140 will be discussed hereinafter.

In one embodiment of the present invention, both NSL 130 and NSL 140 are wireless connections. For example, NSLs 130 and 140 may be conventional wireless data connections, or satellite links that are capable of providing satellite data communication. Generally, NSLs 130 and 140 may be considered auxiliary to the other communication technology implemented by the various storage nodes (90, 100, 110, 120).

Architecture 80 includes sidefiles. In particular, primary storage node 90 includes a sidefile 150, secondary storage node 100 includes a sidefile 160, tertiary storage node 110 includes a sidefile 170 and quaternary storage node 120 includes an optional sidefile 180. Sidefile 150 keeps track of writes sent to secondary storage node 100 and tertiary storage node 110. Sidefile 160 keeps track of writes sent to tertiary storage node 110 and quaternary storage node 120. Sidefile 170 keeps track of writes sent to quaternary storage node 120, and would be used to keep track of writes sent to another, e.g., a quinary, storage node if one was in communication with quaternary storage node 120. Sidefile 180, although depicted as being present in quaternary storage node 120, is not in use since additional storage nodes are not illustrated in FIG. 2 and so is considered optional.

Sidefiles (150, 160, 170, 180) may be embodied in any conventional software code running on primary storage node 90 and the various storage nodes (100, 110, 120). Of course, such conventional software code may include various code segments for implementing sidefiles (150, 160, 170, 180). Alternatively, sidefiles (150, 160, 170, 180) may be implemented using hardware associated with primary storage node 90 and the various other storage nodes (100, 110, 120). For example, sidefiles (150, 160, 170, 180) may be implemented with various processing/computer, etc, hardware devices. Such devices are understood by artisans skilled in the relevant arts.

FIG. 3 illustrates a sidefile in accordance with an embodiment of the present invention. As is illustrated in FIG. 3, sidefile 150 includes a Write_Where field 300, a Write_What field 310, a Sequence_Num field 320, a ACK_Node_N+1 field 340 and a ACK_Node_N+2 field 350. Contents of Write_Where field 300 indicate one or more locations, e.g., LU (logical unit) and track & sector information, on the storage media where the respective writes are to take place. Contents of Write_What field 310 indicate data being buffered that corresponds to respective track and sector information in Write_Where field 300. Contents of Sequence_Num field 320 indicate sequence numbers associated with the respective data listed in Write_What field 310 and track & sector information listed in Write_Where field 300.

Sidefile 150 also includes write-acknowledgement fields, namely ACK_Node_N+1 field 340 and ACK_Node_N+2 field 350, which indicate whether a next downstream node (or, in other words, node N+1 where primary storage node 90 is considered to be node N) and a next-next downstream node (or, in other words, node N+2) have acknowledged receipt of respective write commands forwarded downstream by primary storage node 90. In the context of sidefile 150, node N+1 is secondary storage node 100 and node N+2 is tertiary storage node 110.

Values in ACK_Node_N+1 field 340 and ACK_Node_N+2 field 350 can include either a logic level high or a logic level low value. A logic level high generally represents a true condition that the particular downstream data storage node has acknowledged receipt of that particular write and a logic level low generally represents a false condition. The other sidefiles (160, 170, 180) may also include the same or similar fields as those discussed in conjunction with sidefile 150. Moreover the other sidefiles (160, 170, 180) function in substantially the same manner as sidefile 150, as discussed herein.

The following discussion pertains to data that, e.g., are: originated by an upstream entity 602 (e.g., a host entity); written to primary storage node 90; tracked by sidefile 150 for downstream delivery acknowledgement; and subsequently stored (or are in the process of being stored) at least in secondary storage node 100 and tertiary storage node 110. FIG. 4A is a UML-type sequence diagram, according to at least one embodiment of the present invention, that will be referred to in the following discussion of primary storage node 90, sidefile 150, secondary storage node 100 and tertiary storage node 110.

In FIG. 4A, host 602 issues a write to primary storage node 90 (message 610). Primary storage 90 node buffers the write (message 612). Here, buffering within a storage node is to be understood as storing the write and its associated data to a suitable buffer, e.g., a write-duplexed semiconductor memory arrangement for which both a main and backup power supply are provided and in which data resides redundantly in at least two semiconductor memory boards such that removal or failure of one of the boards does not render the data inaccessible. Once a write is buffered as such in the storage node, then the write is considered as having been received in the storage node. Yet storage primary storage node 90 does not send an acknowledgement of receipt at this time. This is because secondary storage node 100 is a synchronous mirror of primary storage node 90.

Synchronous storage should be understood as the write being stored in two separate storage nodes, e.g., primary storage node 90 and secondary storage node 100, before primary storage node 90 can acknowledge to host 602 receipt of the write (originally presented via message 610). As a practical consequence, host 602 is blocked from sending a second write to primary storage node 90 until it receives acknowledgement from primary storage node 90 of the first write having been received.

As preparation for forwarding the buffered write (see message 612) downstream to secondary storage node 100, primary storage node 90 prepares (message 614) sidefile 150 to track (or, in other words, maintain a status as to) whether acknowledgments have been received from secondary storage node 100 and tertiary storage node 110. Then primary storage node 90 forwards the write to secondary storage node 100 (message 616).

Secondary storage node 100 buffers the write (message 618). As tertiary storage node 110 is an asynchronous mirror of secondary storage node 100, it is not necessary for secondary storage node 100 to confirm that the write is stored in two places before secondary storage node 100 can send an acknowledgement back to primary storage node 90. Hence, to minimize the duration that host 602 is blocked while awaiting acknowledgement from primary storage node 90, secondary storage node 100 sends (message 620) upstream to primary storage node 90 before forwarding the write downstream.

Upon receiving the acknowledgement, primary storage node 90 updates (message 622) its acknowledgement-tracking in sidefile 150 and then recognizes that the write is now received at two sites. Accordingly, primary node 90 then sends (message 624) acknowledgement upstream to host 602.

The writing process to sidefile 150 includes filing in Write_Where field 300, Write_What field 310, Sequence_Num field 320, ACK_Node_N+1 field 340 (which tracks the arrival of that write at secondary storage node 100) and ACK_Node_N+2 field 350 (which tracks the arrival of that write at secondary storage node 110, and which is two storage nodes downstream). Initially, ACK_Node_N+1 field 340 and ACK_Node_N+2 field 350 are set to a logic level low state. In addition, Sequence_Num field 320 is assigned the next available unique sequence number that may be used to identify a specific write.

Tertiary storage node 110 is an asynchronous mirror of secondary storage node 100. Similarly, all subsequent storage nodes K+P (where tertiary storage node 110 is node K), e.g., quaternary storage node 120 (node K+1 where P=1), can be asynchronous mirrors of their immediately upstream storage nodes (K+P−1). Hence, after acknowledging (message 620) receipt to primary storage node 90, secondary storage node 100 asynchronously forwards (message 626) the write to tertiary storage node 110. As will be discussed below (in terms of FIG. 4B), there is more that secondary storage node 100 does here; but FIG. 4A is concerned more with the behavior of primary storage node 90, so such is not depicted in FIG. 4A.

Tertiary storage node 110 buffers (message 628) the write; similarly, additional actions which tertiary storage node 110 takes are not depicted here, for simplicity as FIG. 4A is concerned more with what primary storage node 90 does. Then tertiary storage node 10 asynchronously sends (message 630) an asynchronous acknowledgement to secondary storage node 100. Secondary storage node 100 asynchronously forwards (message 632) the acknowledgement to primary storage node 90. Then primary storage node 90 updates (message 634) its acknowledgement-tracking in sidefile 150.

It is to be noted that messages 622 and 624 are relatively sequential, and that messages 626, 628 and 630 are relatively sequential, but message 622 does not necessarily precede, follow or occur simultaneously with message 626. Various sequences among messages 622 & 624 relative to messages 626, 628 & 630 are possible. Regardless, message 630 precedes message 632. Also, message 624 should precede message 632.

As noted above, some of the actions taken by secondary node 100 are not illustrated in FIG. 4A because FIG. 4A is more concerned with primary storage node 90. In contrast, FIG. 4B is more concerned with secondary storage node 100. FIG. 4B is a UML-type sequence diagram, according to at least one embodiment of the present invention.

In FIG. 4B, after secondary storage node 100 sends (message 620) the acknowledgement to primary storage node 90 but before it forwards (message 626) the write, secondary storage node 100 prepares (message 640) sidefile 160 to track whether acknowledgments have been received from tertiary storage node 110 (namely, node N+1 where node 100 is node N) and quaternary storage node 120 (namely, node N+2 relative to node 100). Also, after tertiary node 110 sends (message 630) the acknowledgement but before secondary storage node 100 forwards (message 632) it, secondary storage node 100 updates (message 646) its acknowledgement-tracking in sidefile 160.

Also in FIG. 4B, tertiary storage node 110 acknowledges (message 630) receipt to secondary storage node 100, tertiary storage node 110 asynchronously forwards (message 644) the write to quaternary storage node 120. Quaternary storage node 120 buffers (message 648) the write and sends (message 650) an asynchronous acknowledgement to tertiary storage node 110. Tertiary storage node 110 asynchronously forwards (message 652) the acknowledgement to secondary storage node 100. Then secondary storage node 100 updates (message 656) its acknowledgement-tracking in sidefile 160.

Similar to FIG. 4A, it is to be noted about FIG. 4B that messages 646 & 632 are relatively sequential, and that messages 644, 648 and 650 are relatively sequential, but message 646 does not necessarily precede, follow or occur simultaneously with message 644. Various sequences among messages 646 & 632 relative to messages 644, 648 & 650 are possible. Regardless, message 650 precedes message 652. Also, message 632 typically would precede message 652.

Just as there are details of the behavior of secondary storage node 100 not illustrated in FIG. 4A (but which are illustrated in FIG. 4B), there are details of the behavior of tertiary storage node 110 and quaternary storage node 120 not illustrated in FIG. 4B because FIG. 4B is more concerned with secondary storage node 110. As tertiary storage node 110 and quaternary storage node 120 are asynchronous mirrors, such additional details of their behavior are similar to the behavior of secondary storage node 100 depicted in FIG. 4B but have not been illustrated in separate drawings for the sake of simplicity.

Each storage node N is responsible for confirming writes to the next downstream node N+1 and the next-next downstream node N+2 (assuming such downstream nodes are present). In contrast, each storage node N according to the Background Art daisy-chain architecture is responsible only for confirming writes to the next downstream node N+1. In architecture 80: if primary storage node 90 is assumed to be node N, then it is responsible for confirming writes to secondary storage node 100 (node N+1) and tertiary storage node 110 (node N+2); if secondary storage node 100 is assumed to be node N, then it is responsible for confining writes to tertiary storage node 110 (node N+1) and quaternary storage node 120 (node N+2); etc.

Each storage node N+1 is responsible for forwarding to node N (or, in other words, forwarding upstream) write-acknowledgements that come from node N+2. Depending upon whether node N is primary storage node 90 or secondary storage node 100, respectively, each of secondary storage node 100 and tertiary storage node 110 can represent node N+1 and so each is responsible for forwarding write-acknowledgements. Tertiary storage node 110 forwards write-acknowledgements from quaternary storage node 120 to secondary storage node 100. Secondary storage node 100 forwards write acknowledgements from tertiary storage node 110 to primary storage node 90. In contrast, no write acknowledgements are forwarded by the storage entities according to architecture 5 of the Background Art.

Once an acknowledgment is received by primary storage node 90, one of ACK_Node_N+1 340 and ACK_Node_N+2 350 of sidefile 150 may be toggled to a logic level high state, or true state. According to at least one embodiment of the present invention, ACK_Node_N+1 field 340 is used to track acknowledgements from secondary storage node 100, and ACK_Node_N+2 field 350 is used to track acknowledgements from tertiary storage node 110. Once both ACK_Node_N+1 340 and ACK_Node_N+2 350 are at a logic high state for a given write, primary storage node 90 can be assured that the given write has been received by secondary storage node 100 and tertiary storage node 110, and an entry in sidefile 150 may be removed. For example, as is illustrated in FIG. 3, the first entry of sidefile 150 could be removed by primary storage node 90 because both ACK_Node_N+1 340 and ACK_Node_N+2 350 contain a logic high level.

Therefore, in contrast to the Background Art data storage systems, at least one embodiment of the present invention does not allow the removal of sidefile entries until two redundant data source storage nodes, if they exist, report back to the source storage node originating the data. Therefore, e.g., in architecture 80, primary storage node 90 should receive an acknowledgment back from secondary storage node 100 and tertiary storage node 110 before an entry in sidefile 150 may be deleted. Similarly, in architecture 80, secondary storage node 100 should receive an acknowledgment back from tertiary storage node 110 and quaternary storage node 120 before removal of an entry from sidefile 160 occurs. This ensures that data sent from a source storage node are verifiably redundantly stored on at least two downstream data storage nodes. Acknowledgements sent back to the source storage node originating the data may be made through secondary storage nodes, or may also be made through auxiliary communication lines (not illustrated).

Due to the redundancy provided by sidefiles (150, 160, 170, 180), NSLs 130 and 140 provide rapid connection to a storage node should an interposed storage node fail. For example, if secondary storage node 100 were to become a single point of failure (SPOF), NSL 130 would then be used as a main link between primary storage node 90 and tertiary storage node 110. In this circumstance, primary storage node 90 would forward writes directly and synchronously via NSL 130 to tertiary storage node 110 (which has now become node N+1 instead of node N+2, where primary storage node 90 is node N), and tertiary storage node 110 would synchronously send back acknowledgements via NSL 130. NSL 140 would function in the same manner if tertiary storage node 110 were to become an SPOF.

Upon occurrence of an SPOF at secondary storage node 110, primary storage node 90 would assess the currency of the data on tertiary storage node 110 based upon the tracking of write acknowledgements recorded in sidefile 150. To the extent that tertiary storage node 110 was not current, primary storage node 90 would supply the necessary writes to make tertiary storage node 110 current. Also upon occurrence of the SPOF at secondary storage node 100, primary storage node 90 (e.g. in addition to overwriting its N+1 acknowledgement list with values from its current N+2 acknowledgement list, and then initializing the N+2 acknowledgement list) begins to track write acknowledgements coming from quaternary storage node 120 (which has now become the node N+2 where primary storage 90 is node N).

In response to the SPOF at secondary storage node 100, tertiary storage node 110 would begin to track via a bitmap all changes to its tracks that take place. If there were to come at time for reinstatement of secondary storage node 100, tertiary storage node 110 could either perform a full copy to secondary storage node 100 or a delta update-copy to secondary storage node 100 based on the changed track bitmap residing at tertiary storage node 110 if secondary storage node 100 was to be reinstated with the same data it contained before its failure or removal.

FIG. 5A illustrates an abstracted multi-site hierarchical pseudo-cascaded (also known as pseudo-daisy-chained) synchronous and asynchronous mirroring variety of data storage architecture 400 illustrated in terms of the example architecture 400 of FIG. 2, according to at least one embodiment of the present invention. Architecture 400 represents a storage hierarchy, e.g., a storage area network (SAN), that is organized as multiple, e.g., two, overlaid triple units 402 and 404. A triple is a group of three nodes of the hierarchy. Each triple unit includes: a head-of-triple (HT) node that is the most-upstream (or, in other words, at the highest level) within the triple unit; a middle-of-triple (MT) node that is immediately downstream (or, in other words, a level below) from the HT node so as to be in the middle of the triple unit; and an end-of-triple (ET) node that is immediately downstream (or, in other words, a level below) from the MT node so as to be the most downstream (or, in other words, at the lowest level) within the triple unit. The HT node does not necessary represent the highest node in the architecture 400.

In triple unit 402, node 90 represents the HT node, node 100 represents the MT node and node 110 represents the ET node. Where node 90 is the HT node, it can be described as node N, and so node 100 represents node N+1, node 110 represents node N+2 and a node upstream from node N (here, node 90) would be, e.g., a node N−1 corresponding to a host entity (not illustrated in FIG. 5A, but see item 602).

In triple unit 404, node 100 represents the HT node, node 110 represents the MT node and node 120 represents the ET node. Where node 100 is the HT node, it can be described as node N, and so node 110 represents node N+1, node 120 represents node N+2 and a node upstream from node N (here, node 100) would be a node N−1 corresponding to node 90.

As noted above, at least one embodiment of the present invention can tolerate an SPOF (again, single point of failure). Tolerance by architecture 400 of an SPOF should be understood in terms of the triple unit defined by the node representing the SPOF and whether the SPOF node is host-writeable or storage-node-write able.

Regardless of which node represents the SPOF, all downstream nodes (assuming there are any) become data starved unless adaptive action is taken. FIG. 5B is a variation of FIG. 5A reflecting changes that can result (according to at least one embodiment of the present invention) when the SPOF occurs at an HT node (again, the node N) that is also host-writable, e.g., node 90. FIG. 6A is a UML-type sequence diagram according to at least one embodiment of the present invention that describes actions associated with the changes to architecture 400 (that are responsive to an SPOF) depicted in FIG. 5B.

An architecture administrator (ADMIN 502 in FIG. 6A) (typically a human) can recognize (arrow 520 in FIG. 6A) and respond to the SPOF at node 90 by doing the following: making the N+1 node (namely, node 100) host-writable, e.g., by commanding (arrow 522) node 100 to switch out of a host-read-only mode and to permit receipt of writes from a host 602; commanding (arrow 528) node 100 to refuse writes from now-failed node 90; and pointing (arrow 532) host 602 (or its equivalent host-failover cluster member, etc.) to write to node 100 instead of node 90. This changes triple unit 402 into triple unit 402' prime (depicted in FIG. 5B), where node 100 is now the HT node, node 110 becomes the MT node and node 120 becomes the ET node. This is further reflected in FIG. 5B by host-writes path 91 and main link 92 being shown as dashed lines instead of solid lines, while a new host-writes path 410 to node 100 is illustrated (as a solid line). No updating of data on node 100 is necessary before resuming host operations because node 100 was a synchronous mirror of node 90; in other words, the data on node 100 is already current relative to node 90 because node 100 is a synchronous mirror.

In turn, the now-host-writable node 100 can then: permit receipt (arrow 524) of writes from host 602; start (arrow 526) a bitmap 412 (as contrasted with a sidefile), e.g., a track-level bitmap or cylinder-level bitmap, that records changes to node 100 that are not made to now-failed node 90; and refuse writes (arrow 530) from now-failed node 90. Bitmap 412 can be used if now-failed node 90 is later reinstated via a delta update (an update only on the basis of track-changes made since the SPOF occurred).

Further as to FIG. 5B, when host 602 writes data (arrow 534), then node 100 does the following: updates (arrow 536) bitmap 412; and forwards (arrow 538) the write via main link 102 to node 110. As node 100 is now the host-writable node, then node 110 is now the node N+1 (relative to node 100 being node N). Hence, node 100 forwards writes synchronously to node 110 (which acknowledges synchronously). Similarly, node 120 is now the node N+2 (relative to node 100 being node N), but node 110 can forward writes asynchronously to node 120, etc.

After node 100 begins acting as a host-writable HT node, the now-failed node 90 can be reinstated. FIG. 6B is a UML-type sequence diagram according to at least one embodiment of the present invention that describes reinstatement actions associated with the changes to architecture 400 (that are responsive to an SPOF) depicted in FIG. 5B. The ADMIN 502 can decide (message 560) to reinstate node 90 and then can do so (as follows) by: commanding (message 562) host 602 to pause writing data (alternatively and/or by commanding node 100 to pause accepting writes); commanding (message 564) node 100 to make either a delta copy based upon bitmap 412 or a full copy to now-failed node 90, after which node 100 discards (message 568) bitmap 412; commanding (message 570) node 100 to indefinitely stop accepting host-writes by switching to a host-read-only mode (which node 100 does at message 572); commanding (message 574) node 100 to begin accepting storage node writes from reinstated node 90 (which node 100 does at message 576); and then commanding (message 578) the host entity to start writing to reinstated node 90 instead of node 100.

FIG. 5C is a variation of FIG. 5A reflecting changes that can result (according to at least one embodiment of the present invention) when the SPOF occurs at an MT node (again, the node N+1) that is not host-writable, e.g., node 100. ADMIN 502 can be relatively less involved when the SPOF occurs at MT node N+1 (here, again, e.g., node 100). Node N (90) can recognize and respond to the SPOF at node 100 by: commanding node 110 (formerly node N+2 relative to node 90 being node N, now node N+1) to remain in host-read-only mode; commanding node 110 to ignore writes forwarded from now failed node 100 and instead accept synchronous writes forwarded from node 90; commanding node 100 to start a bitmap to track all changes to its media subsequent to the SPOF at node 100 (for possible later use in a delta update); assessing the currency of the data in node 110 according to the tracking data in its sidefile 150; and updating node 110 to full synchronous data currency if needed. ADMIN 502 can establish a new NSL 406 between node 90 and node 120 (formerly node N+3 relative to node 90 being node N, now node N+2).

Should it be desired to reinstate now-failed node 100, then ADMIN 502 can do so (as follows) by: commanding host entity 602 to pause writing data (alternatively and/or by commanding node 90 to pause accepting writes from host entity 602); commanding node 110 to make either a delta copy based upon a bitmap 408 (FIG. 5C) or a full copy to now-failed node 100, after which node 110 would discard bitmap 408; commanding node 110 to indefinitely stop accepting writes forwarded by node 90; commanding node 110 to begin accepting writes forwarded from now-reinstated node 100; and then commanding host entity 602 to resume sending writes (alternatively and/or by commanding node 90 to stop holding off writes).

It is possible that an ET node that is at the end of the daisy chain, e.g., node 120, can be an SPOF. The upstream HT and MT nodes, e.g., nodes 100 and 110, can respond by noting that node 120 is unresponsive. Also, node 110 (which is node N+1 where node 120 is node N+2) can stop forwarding writes to now-failed node 120 and instead start a bitmap to track all changes to its media subsequent to the SPOF at node 120 for possible later use in a downstream delta update to node 120 (if node 120 is to be reinstated and if storage node 120 will have the same data it contained before its failure or removal).

Should it be desired to reinstate now-failed node 120, then ADMIN 502 can do so (as follows) by: commanding host entity 602 to pause writing data (alternatively and/or by commanding node 90 to pause accepting writes from host entity 602); commanding node 110 to make either a delta copy based upon bitmap 408 or a full copy to now-failed node 120, after which node 110 would discard bitmap 408; commanding node 110 to begin forwarding writes to now-reinstated node 120; and then commanding host entity 602 to resume sending writes (to node 90).

As is readily understood by those of ordinary skill in the art, although the embodiments of the present invention have been described having (using) a finite number of storage nodes, such cannot be construed as being limiting of the present invention. To the contrary, a data source storage node may be connected to an unlimited number of storage nodes. That is, as long as the processing capability of the specific storage nodes is sufficient, a significant number of storage nodes may be implemented.

In addition, although the various source and host storage devices are shown as being in direct communication with one another, it is clear that indirect communication between the various source and storage nodes may also be used. That is, indirect routing of data signals, via intermediaries, between various sources and storage nodes may be used if desired and if such is found practical due to implementation constraints and/or design requirements.

The sidefiles in accordance with example embodiments of the present invention may be implemented using hardware or software code. In particular, the present invention may be embodied as a physical device (e.g., tangible electronics), a combination of software objects, or a combination of both physical and software elements, as desired by design and implementation requirements and/or restraints.

Of course, although several variances and example embodiments of the present invention are discussed herein, it is readily understood by those of ordinary skill in the art that various additional modifications may also be made to the present invention. Accordingly, the example embodiments discussed herein are not limiting of the present invention.

What is claimed:

1. A daisy-chained device-mirroring architecture comprising:
   a storage node N configured to mirror data on an entity representing node N−1;

a storage node N+1 daisy-chain-coupled via a first main link to, and configured to mirror data on, the node N; and
a storage node N+2 daisy-chain-coupled via a second main link to, and configured to mirror data on, the node N+1;
each of the nodes N and N+1 being operable under normal circumstances to forward downstream writes received thereby to the nodes N+1 and N+2 via the first and second main links, respectively;
the node N being operable to track acknowledgments by the node N+1 and by the node N+2 of writes that the node N has forwarded.

2. The architecture of claim 1, further comprising:
a standby node-shunting link (NSL) directly coupling the node N to the node N+2 so as to make the architecture tolerable of a single point of failure (SPOF) at node N+1.

3. The architecture of claim 2, wherein:
the node N, under circumstances of an SPOF at node N+1, is operable to forward writes directly to node N+2 via the NSL.

4. The architecture of claim 3, wherein:
the node N+2, under the circumstances of the SPOF at node N+1, is operable to generate a bitmap of writes received directly via the NSL from the node N.

5. The architecture of claim 4, wherein:
the node N+2, under the circumstances of the SPOF at node N+1, is operable to participate in reinstating the now-failed node N+1 by making a delta copy to the now-failed node N+1 of writes made since the SPOF occurred, based upon the bitmap.

6. The architecture of claim 1, further comprising:
a storage node N+3 daisy-chain-coupled via a third main link to, and configured to mirror data on, the node N+2;
the node N+2 being operable under normal circumstances to forward writes received thereby to the node N+3 via the third main link; and
the node N+1 being operable to track acknowledgments by the node N+2 and by the node N+3 of writes that the node N+2 has forwarded.

7. The architecture of claim 6, further comprising:
a standby node-shunting link (NSL) directly coupling the node N+1 to the node N+3 so as to make the architecture tolerable of a single point of failure (SPOF) at node N+2.

8. The architecture of claim 7, wherein:
the node N+1, under circumstances of an SPOF at node N+2, is operable to forward writes directly to node N+3 via the NSL.

9. The architecture of claim 8, wherein:
the node N+3, under the circumstances of the SPOF at node N+2, is operable to generate a bitmap of writes received directly via the NSL from the node N+1.

10. The architecture of claim 9, wherein:
the node N+3, under the circumstances of the SPOF at node N+2, is operable to participate in reinstating the now-failed node N+2 by making a delta copy to the now-failed node N+2 of writes made since the SPOF occurred, based upon the bitmap.

11. The architecture of claim 8, wherein:
the NSL is a second NSL;
the architecture further comprises
a first NSL directly coupling the node N to the node N+2 so as to make the architecture also tolerable of an SPOF at node N+1; and
the architecture is organized into overlapping triple units, each triple unit being defined by one of the NSLs.

12. The architecture of claim 11, wherein:
the first NSL defines a first triple unit as including the nodes N, N+1 and N+2; and
the second NSL defines a second triple unit as including the nodes N+1, N+2 and N+3.

13. The architecture of claim 8, wherein:
the node N+2 is operable to forward upstream to the node N+1 write-acknowledgments received from the node N+3.

14. The architecture of claim 1, wherein:
the node N+1 is operable to forward upstream to the node N write-acknowledgments acknowledgments received from the node N+2.

15. The architecture of claim 1, wherein:
storage node N is host-writable;
storage node N+1, under normal circumstances, is operable as a synchronous mirror of storage node N;
storage node N+2, under normal circumstances, is operable as an asynchronous mirror of storage node N; and
storage node N+2, under circumstances of a single point of failure (SPOF) at node N+1, is operable instead as a synchronous mirror of storage node N.

16. A method of operating a daisy-chained device-mirroring architecture that includes a storage node N configured to mirror data on an entity representing node N−1, a storage node N+1 daisy-chain-coupled via a first main link to, and configured to mirror data on, the node N, and a storage node N+2 daisy-chain-coupled via a second main link to, and configured to mirror data on, the node N+1, where each of the nodes N and N+1 are operable under normal circumstances to forward writes received thereby to the nodes N+1 and N+2 via the first and second main links, respectively, the method comprising:
tracking, at the node N, acknowledgments by the node N+1 and by the node N+2 of writes that the node N has forwarded.

17. The method of claim 16, further comprising:
forwarding from node N, under circumstances of a single point of failure (SPOF) at node N+1, writes directly to node N+2 via a standby node-shunting link (NSL) so as to make the architecture tolerable of an SPOF at node N+1.

18. The method of claim 16, further comprising:
generating, at the node N+2 under the circumstances of the SPOF at node N+1, a bitmap of writes received directly via the NSL from the node N.

19. The method of claim 18, further comprising:
participating, under the circumstances of the SPOF at node N+1, in a reinstatement of the now-failed node N+1 by causing the node N+2 to make a delta copy to the now-failed node N+1 of writes made since the SPOF occurred, based upon the bitmap.

20. The method of claim 16, wherein:
the architecture further includes a storage node N+3 daisy-chain-coupled via a third main link to, and configured to mirror data on, the node N+2, the node N+3 being operable to forward under normal circumstances to forward writes received thereby to the node N+3 via the third main link; and
the method further comprises:
tracking, at the node N+1, acknowledgements by the node N+2 and by the node N+3 of writes that the node N+2 has forwarded.

21. The method of claim 20, further comprising:
forwarding from node N+1, under circumstances of a single point of failure (SPOF) at node N+2, writes directly to node N+3 via a standby node-shunting link (NSL) so as to make the architecture tolerable of an SPOF at node N+2.

22. The method of claim 21, further comprising:
generating, at the node N+3 under the circumstances of the SPOF at node N+2, a bitmap of writes received directly via the NSL from the node N+1.

23. The method of claim 22, further comprising:
participating, under the circumstances of the SPOF at node N+2, in a reinstatement of the now-failed node N+2 by causing the node N+3 to make a delta copy to the now-failed node N+2 of writes made since the SPOF occurred, based upon the bitmap.

24. The method of claim 20, wherein:
forwarding upstream, from the node N+2, to the node N+1 write-acknowledgments received from the node N+3.

25. The method of claim 16, wherein:
forwarding upstream, from the node N+1 the node N, write-acknowledgments received from the node N+2.

26. The method of claim 16, wherein:
storage node N is host-writable;
operating storage node N+1, under normal circumstances, as a synchronous mirror of storage node N;
operating storage node N+2, under normal circumstances, as an asynchronous mirror of storage node N; and
operating storage node N+2, under circumstances of a single point of failure (SPOF) at node N+1, instead as a synchronous mirror of storage node N.

27. A method of operating a data storage architecture, the data storage architecture having a primary storage node, a secondary storage node, and a tertiary storage node, wherein the primary storage node is in communication with the secondary storage node, and the secondary storage node is in communication with the tertiary storage node, each of the storage nodes employing a sidefile and bitmap, the method comprising:
utilizing a sidefile of the primary storage node to track receipt of write acknowledgements sent by each of the secondary storage node and the tertiary storage node.

28. The method according to claim 27, further comprising:
providing the sidefile with at least first and second logic fields; and
wherein the utilizing of the sidefile includes
recording receipt of write-acknowledgements from the secondary storage node and the tertiary storage node in the first and second logic fields, respectively.

29. A machine-readable medium including instructions execution of which by a machine causes operation of a data storage architecture, the data storage architecture having a primary storage node, a secondary storage node, and a tertiary storage node, wherein the primary storage node is in communication with the secondary storage node and the secondary storage node is in communication with the tertiary storage node, each of the storage nodes employing a sidefile and bitmap, the machine-readable instructions comprising:
a code segment that utilizes a sidefile of the primary storage node to track receipt of write acknowledgements sent by each of the secondary storage node and the tertiary storage node.

30. A primary storage node in a data storage architecture, the primary storage node being in communication with a secondary storage node, the secondary storage node being in communication with a tertiary storage node, the primary storage node comprising:
a memory; and
a processing unit to configure the memory;
a least a portion the memory being configured as a sidefile that includes at least first and second logic fields in which receipt of write-acknowledgements from the secondary storage node and the tertiary storage node are recordable in the first and second logic fields, respectively.

31. A daisy-chained device-mirroring architecture comprising:
a storage node N configured to mirror data on an entity representing node N−1;
a storage node N+1 daisy-chain-coupled via a first main link to, and configured to mirror data on, the node N, and
a storage node N+2 daisy-chain-coupled via a second main link to, and configured to mirror data on, the node N+1;
the node N+1 being operable to forward upstream write-acknowledgements received thereby.

32. The architecture of claim 1, further comprising:
a storage node N+3 daisy-chain-coupled via a third main link to, and configured to mirror data on, the node N+2;
wherein the node N+2 is operable to forward upstream write-acknowledgements received thereby.

33. A method of operating a daisy-chained device-mirroring architecture that includes a storage node N configured to mirror data on an entity representing node N−1, a storage node N+1 daisy-chain-coupled via a first main link to, and configured to mirror data on, the node N, and a storage node N+2 daisy-chain-coupled via a second main link to, and configured to mirror data on, the node N+1, where each of the nodes N and N+1 are operable under normal circumstances to forward writes received thereby to the nodes N+1 and N+2 via the first and second main links, respectively, the method comprising:
forwarding upstream write-acknowledgements received at the node N+1.

34. The method of claim 33, wherein:
the architecture further includes a storage node N+3 daisy-chain-coupled via a third main link to, and configured to mirror data on, the node N+2; and
the method further comprises forwarding upstream write-acknowledgements received at the node N+2.

* * * * *

UNITED STATES PATENT AND TRADEMARK OFFICE
CERTIFICATE OF CORRECTION

PATENT NO. : 7,165,141 B2 Page 1 of 1
APPLICATION NO. : 10/787161
DATED : January 16, 2007
INVENTOR(S) : Robert A Cochran et al.

It is certified that error appears in the above-identified patent and that said Letters Patent is hereby corrected as shown below:

In column 3, line 19, delete " ⬅︎⬅︎⬅︎ " and insert -- ➡︎➡︎➡︎ --, therefor. (2nd Occur)

In column 4, line 17, delete "10" and insert -- 110 --, therefor.

In column 7, line 10, delete "filing" and insert -- filling --, therefor.

In column 7, line 38, delete "10" and insert -- 110 --, therefor.

In column 8, line 45, delete "confining" and insert -- confirming --, therefor.

Signed and Sealed this

Twentieth Day of July, 2010

David J. Kappos
*Director of the United States Patent and Trademark Office*